Dec. 4, 1956  V. L. DARBY  2,772,842
CONTROL SURFACE SEAL
Filed May 25, 1953  2 Sheets-Sheet 1

Vene L. Darby
INVENTOR.

BY
HIS PATENT ATTORNEY.

Dec. 4, 1956 V. L. DARBY 2,772,842
CONTROL SURFACE SEAL
Filed May 25, 1953 2 Sheets-Sheet 2

Vene L. Darby
    INVENTOR.
BY
HIS PATENT ATTORNEY.

United States Patent Office 2,772,842
Patented Dec. 4, 1956

2,772,842

CONTROL SURFACE SEAL

Vene L. Darby, Redondo Beach, Calif., assignor to North American Aviation, Inc.

Application May 25, 1953, Serial No. 357,270

5 Claims. (Cl. 244—90)

The present invention relates broadly to aerodynamically balanced control surfaces and more particularly to improvements in the balance seals for such surfaces.

As is well known, the control or pilot force necessary to move an aircraft control surface from its neutral position increases materially with increases in the angle of displacement of the surface. Heretofore numerous means have been suggested and utilized for providing balancing forces in opposition to the aerodynamic forces to which the displaced surface is subjected. Among the more advantageous and successful of these prior balancing means has been the internal pressure balance arrangement in which a seal is provided between a paddle balance at the nose of the control surface and the walls of the pressure compartment in the fixed airfoil or wing in order to take advantage of the pressures developed within the airfoil compartment at each side of the sealed paddle balance.

The present invention relates to improvements in the seals for such balanced control surface installations wherein the aerodynamic balance is provided by means of the paddle balance or forward extension from the nose of the control surface into the pressure compartment formed within the airfoil forward of the control surface. The present invention is more particularly directed to an improved arrangement of cutting, forming and folding a flexible seal between the movable control surface and the fixed wing structure to provide a highly effective pressure-tight seal. The present improvement is particularly adapted for use in power boost control systems for either large or high speed aircraft and particularly to provide a highly efficient seal to assist the pilot in the event of failure or loss of boost in the control system. Further objects and advantages of the present invention include the provision of a relatively simple form of seal which is less difficult to manufacture and install but which is yet highly effective in its sealing properties. It is a corollary object to provide a pressure seal which is less bulky and complex than many prior fabric assemblies and less awkward to install, and a further object resides in the provision of a seal arrangement having an extensive service life under conditions of excessive flexing strains.

Other objects and advantages of the present invention will become apparent to those skilled in the art after reading the following description taken in conjunction with the accompanying drawings, forming a part hereof, in which.

Figure 1:
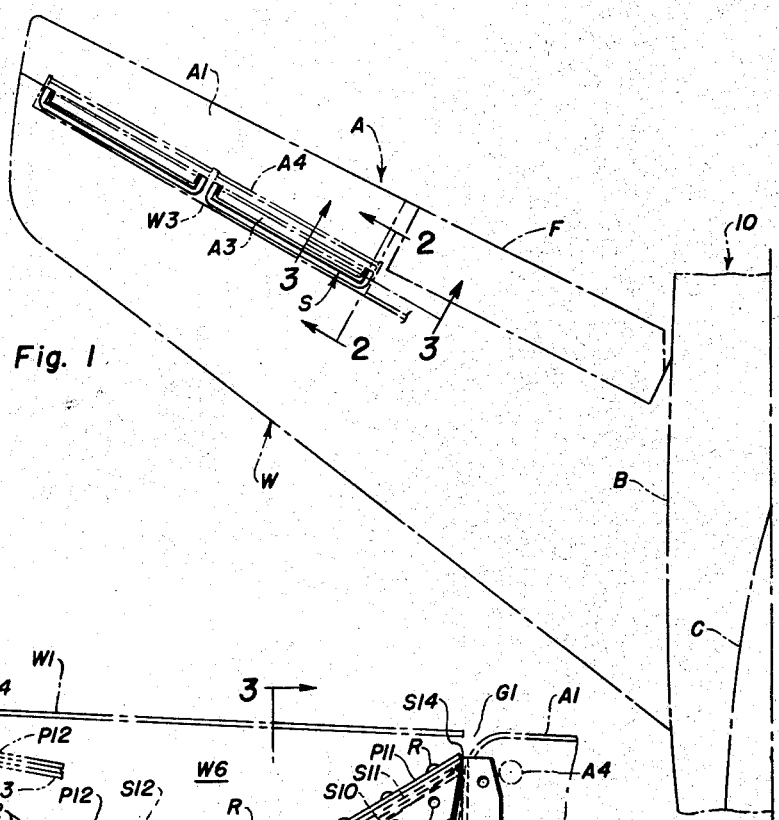
Fig. 1 is a partial plan view of an airplane and one of its wings to which one form of the present invention has been applied.

Referring now to Fig. 1, the numeral 10 represents a portion of a high speed aircraft having a fuselage or body B and a cockpit portion C, as well as a sweptback wing W on the trailing portion of which are operatively mounted the aileron A and the flap F. The aileron A is provided with a forwardly extending balance or paddle portion A3 and between this paddle and the adjacent wing structure there is disposed a form of the improved seal S. It will be understood that the aileron A, as well as the flap F, are actuated by conventional mechanisms which are well known and have not been illustrated as they do not form a part of the novel features of the present invention.

Figure 2:
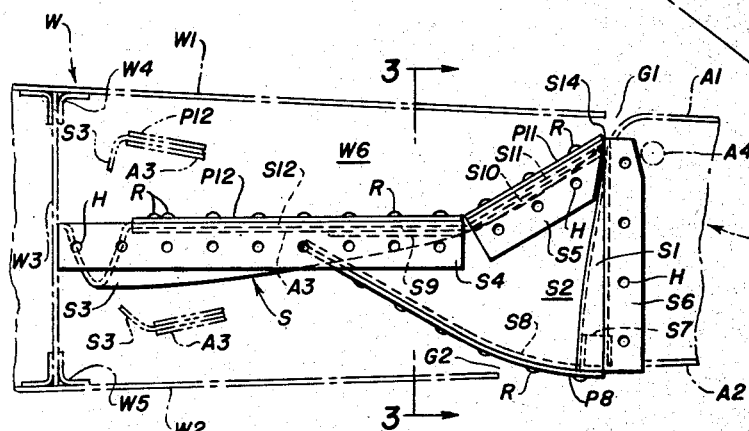
Fig. 2 is a sectional elevation of the improved seal arrangement of Fig. 1, looking spanwise as taken along the lines 2—2 thereof.
Figure 3:
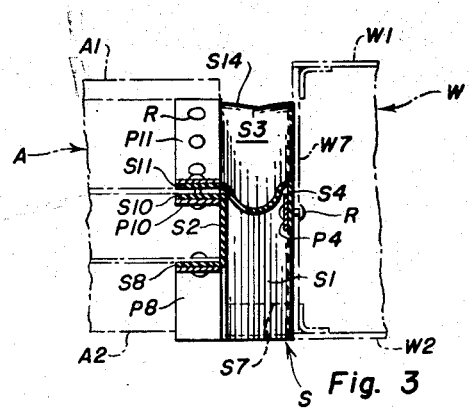
Fig. 3 is a sectional view of the same looking chordwise as taken along the line 3—3 of Figs. 1, 2 and 4.
Figure 4:
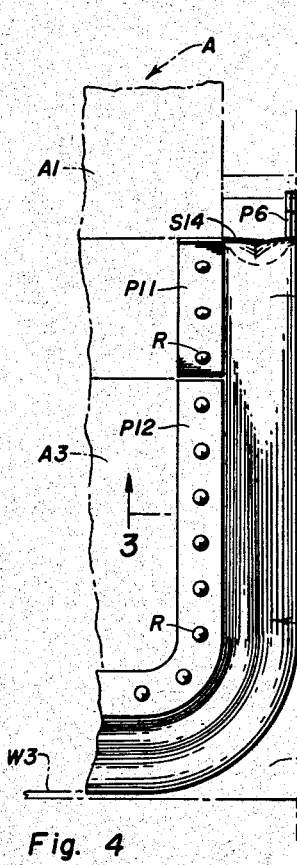
Fig. 4 is a plan view of the same.

Referring more particularly to Figs. 2, 3 and 4, the aileron A is provided with an upper skin surface A1 and a lower skin surface A2, and is pivoted or hinged adjacent its upper surface at the pivot or hinge mounting A4. The adjacent portion of the airfoil or wing W is also provided with an upper skin or surface W1, a lower surface or skin W2, and a rear spar or bulkhead W3 provided with the upper and lower chord elements W4 and W5, respectively, by which the spar is attached to the skin surfaces. In the section shown in Fig. 2, the upper surfaces of the aileron and the wing as designated at A1 and W1 are substantially aligned in the neutral position of the aileron with an intermediate gap or air pressure inlet G1 therebetween. Similarly, in the neutral position of the aileron, the lower skin surface A2 thereof is substantially aligned with the corresponding lower skin surface W2 of the wing with a similar gap G2 disposed therebetween. It will also be noted that the front or leading edge of the paddle portion A3 of the aileron is spaced an appreciable distance from the spar or bulkhead wall W3 to provide space for the balance seal S therebetween and the ends of the paddle A3 are similarly spaced from the chordwise extending bulkheads W6 and W7, which spaces are also sealed off by the improved curtain or seal S more fully described below. It will be noted that within the trailing portion of the wing W there is formed, by the upper and lower skin surfaces W1 and W2 and the bulkhead W3, a conventional pressure compartment which is divided horizontally by the aileron paddle A3 and the improved seal S into upper and lower differential pressure chambers which are opened respectively to the atmosphere through the air inlets or gaps G1 and G2, to provide an aerodynamically balanced aileron which functions in a manner well-known in the art.

Figure 5:
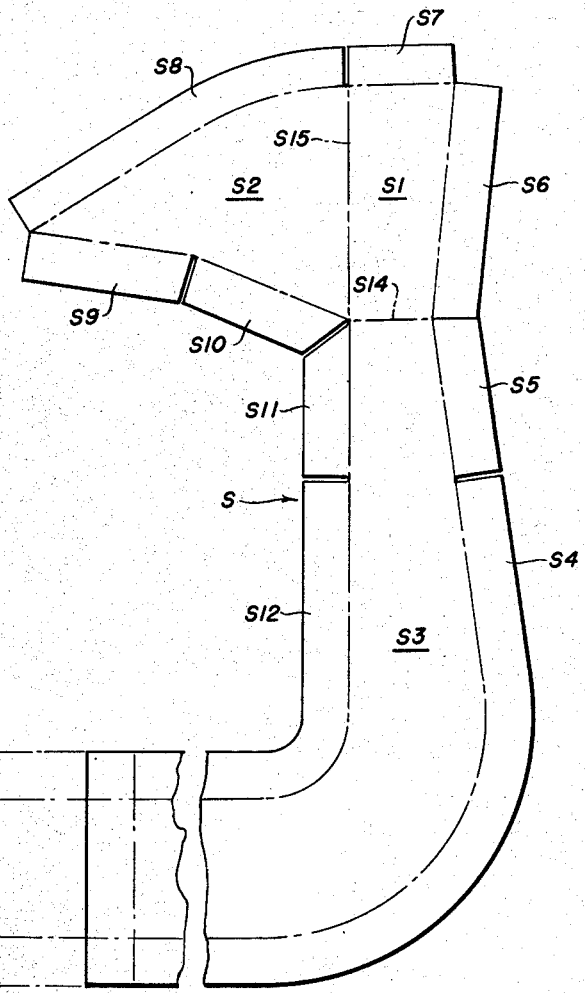
Fig. 5 is a developed plan view of the seal illustrating its cutting and folding pattern prior to installation.

The end seal is shown in its developed form in Fig. 5 from which it will be noted that it comprises a single sheet of flexible fabric having a main L-shaped portion S3 with a rounded corner to fit between the corner of the paddle A3 and the fillet W8 formed within the pressure compartment of the wing; and an offset portion comprising the areas S1 and S2 arranged to be folded downwardly and forwardly on the fold lines S14 and S15, respectively. The marginal portions S4, S5 and S6 are each bent downwardly and are fastened to the adjacent walls W3, W8 and W7 of the wing compartment, being fastened thereto by the retainer plates or strips P4 and P6 suitably apertured or provided with the holes H to receive the attachment rivets R, or other fastening means, all as more particularly shown in Figs. 2, 3 and 4. In the neutral position of the aileron A, the seal area S1 is disposed vertically just forward of the hinge mounting A4 of the aileron and the area S2 is shaped to conform with the converging leading edge portion of the aileron to provide a complete seal of the end of this portion of the control surface. The marginal strip S7 is folded back against the area S1 to which it may be stitched or hemmed to reinforce the lower margin of the area S1 which remains as a free edge. The adjacent marginal portions S8, S9 and S10 are folded at right angles to the area S2 and are similarly attached to the leading edge of the aileron by the retainer plates P8 and P10 by the rivets R. The marginal tab S8 is attached to the aileron lower surface and the tabs S10 and S11 are superimposed and attached to the upper aileron surface. The marginal tabs S9 and S12 are also superimposed, being attached to the balance paddle A3. Similarly, the marginal portions S11 and S12 of the main L-shaped area S3 are suitably apertured for the rivets R by which they are retained by the plates P11 and P12 to the leading edge and balance portion A3 of the aileron.

Figure 6:
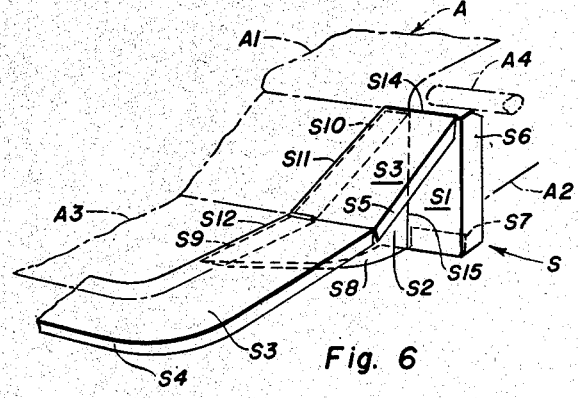
Fig. 6 is a diagrammatic perspective view of the same as applied to the control surface.

After the seal material has been cut to the pattern shown in Fig. 5 and the marginal tabs notched or cut into the fold lines where indicated to permit separate folding, the area S1 is folded back at right angles about the fold line S14; and the area S2 is subsequently folded forwardly, also through a right angle, about the fold line S15 to thereby assume the shape and relationship shown in Fig. 6 in which a complete three-plane corner seal is provided comprising the transverse or vertical spanwise portion S1, the vertically disposed chordwise portion S2 and the substantially horizontal main portion S3. The aft portion of the latter area S3 slopes upwardly to conform with the contour of the leading edge of the aileron to meet the vertical portion S1 at the fold line S14 contiguous to the hinge mounting A4. It will be understood that the width of the areas S1 and S3 are substantially greater than the clearance space between the edge of the aileron paddle A3 and the compartment walls W3—W7—W8 formed by the wing and that as the seal is installed and attached to the aileron and the wing it is brought together at its edges to provide a fold of surplus material extending throughout the seal from a first end of the area S3 across the fold S14 down through the vertical portion S1 and down to the hem S7. Inasmuch as the margins S4, S5 and S6 are attached to the fixed wing structure and the opposite margins S8, S9, S10, S11 and S12 are attached to the movable aileron nose, the folded excess material permits relative movement between these two components by flexing and folding of the seal S, which at the same time prevents flow of air from either of the pressure compartments to the other. It will be noted that the seal extends to the upper gap G1 and aft of the lower gap G2 and that the only communication directly between the gaps G1 and G2 is through the atmosphere at or aft of the hinge mounting A4; that forward of this region there is provided a pressure-tight seal between the aileron and the wing and all flow is prevented from one side of the paddle balance A3 to the other.

The disclosed sealing arrangement, accordingly, provides a complete barrier or dam, precluding the possibility of pressure leaking from one side of the balance paddle A3 to the other, while at the same time establishing a barrier the full depth of the aileron at the point of sealing. The improved arrangement accomplishes the required sealing and renders the aerodynamic balance as effective as possible. As will be noted, it is made from a unitary fabric element which is relatively simple to cut and sew and provides improved sealing effectiveness and a long life under conditions of excessive flexing and strains encountered in control surface operation. The present seal element is readily installed and includes adequate provision for unrestricted movement of the balance paddle throughout the full range of its travel without imposing localized strains or severe flexing of the seal material. The fabric utilized is preferably a reinforced nylon cloth having a grid of strengthening elements and is coated to render the same impervious.

Other forms and modifications of the present invention, which will become apparent to those skilled in the art after reading the foregoing description, are intended to come within the scope and spirit of this invention, as more particularly set forth in the appended claims.

I claim:

1. An aerodynamic balance comprising a wing structure, a control surface operatively mounted upon said wing structure and having a forwardly extending balance paddle provided with free edges adjacent said wing structure, a unitary flexible seal for the space between the free edges of said control surface paddle and said adjacent wing structure, said seal having a first area of greater width than the space between the control surface paddle and the wing structure, said first area having a first margin attached to the control surface and an opposite margin attached to the wing structure, said first area disposed substantially in the plane of said control surface paddle, said seal having a second area folded with respect to said first area and having its opposite margins attached to said control surface and to the wing structure, respectively, said second area being disposed in the direction of the thickness of said control surface.

2. In an aerodynamic balance comprising an airfoil, a control surface operatively mounted within a pressure compartment formed within said airfoil, said control surface having a forwardly extending portion comprising a relatively thin paddle and an increasingly thickening nose portion, a flexible seal having a first portion attached to the said paddle portion, to the airfoil and to the thickening nose portion of said control surface, said flexible seal having a second portion extending spanwise of said control surface in the direction of the thickness thereof having its opposed edges attached to said control surface and to said airfoil, respectively.

3. In an aerodynamic balance comprising an airfoil, a control surface hingedly mounted within a pressure compartment formed within said airfoil, said control surface having a forwardly extending portion comprising a relatively thin paddle, said control surface having a relatively thicker nose portion forward of the hinge mounting upon said airfoil, a flexible seal having a first portion attached to the airfoil, to the upper surface of said paddle portion and to the upper surface of said nose portion of said control surface, and a further portion of said seal extending spanwise of said control surface in the direction of the thickness of said control surface and having its opposed edges attached to said control surface and to said airfoil.

4. In an aerodynamic balance for a control surface operatively mounted within a pressure compartment formed within an airfoil, the control surface having a forwardly extending paddle portion and a relatively thicker nose portion spaced from the walls of said pressure compartment, a flexible seal extending across the space between said control surface and said pressure compartment walls, said seal having a first area attached to said airfoil, to said paddle portion and to said nose portion of said control surface, said seal having a second and contiguous area substantially normal to said first area disposed spanwise and in the direction of the thickness of the control surface, said second area attached to said airfoil and to said control surface, said seal having a third and contiguous area substantially normal to both said first and second areas attached to the end of the nose portion in the chordwise direction thereof to form a pressure-tight barrier between said control surface and said airfoil.

5. In an aerodynamic balance comprising, a wing structure, a control surface operatively mounted upon said wing structure, a pressure compartment formed within said wing structure, said control surface having a forwardly extending paddle balance portion disposed within said pressure compartment and dividing said pressure compartment into differential pressure chambers, flexible seal means disposed substantially in the plane of said paddle balance portion and attached to said wing structure and to the lateral edge of the forwardly extending paddle balance portion of said control surface for maintaining the separation of said differential pressure chambers, further flexible seal means contiguous to said first flexible seal means extending spanwise of said control surface and in the direction of the thickness thereof, said further seal means attached to said control surface and to said wing structure to form a barrier wall at the aft end of said pressure compartment between the lateral edge of said control surface and said wing structure.

References Cited in the file of this patent

UNITED STATES PATENTS

| | | |
|---|---|---|
| 2,331,047 | Schairer | Oct. 5, 1943 |
| 2,405,208 | Harris | Aug. 6, 1946 |
| 2,478,830 | Lemonier et al. | Aug. 9, 1949 |